United States Patent
Faerber et al.

(10) Patent No.: US 6,236,265 B1
(45) Date of Patent: May 22, 2001

(54) RADIO STATION PREAMPLIFIER CIRCUIT WITH INTERIOR AND EXTERIOR PREAMPLIFIERS

(75) Inventors: Michael Faerber, Wolfratshausen; Helmut Heinz, Windach; Meik Kottkamp, Munich, all of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/161,444

(22) Filed: Sep. 25, 1998

(30) Foreign Application Priority Data

Sep. 25, 1997 (DE) .............................................. 197 42 346

(51) Int. Cl.$^7$ ........................................................ H03F 1/14
(52) U.S. Cl. .............................. 330/51; 330/150; 330/151
(58) Field of Search ................................. 330/51, 151, 150

(56) References Cited

U.S. PATENT DOCUMENTS

| | | | |
|---|---|---|---|
| 4,565,972 | 1/1986 | Kaegebein | 330/124 D |
| 5,008,631 | * 4/1991 | Scherer | 330/51 |
| 5,418,490 | * 5/1995 | Kaegebein | 330/51 |

* cited by examiner

Primary Examiner—Michael B Shingleton
(74) Attorney, Agent, or Firm—Schiff Hardin & Waite

(57) ABSTRACT

A method and circuit for preamplifying reception signals for a radio station. A first preamplifier is connected between an antenna unit and to the radio station. A second preamplifier is provided in the radio station, the second preamplifier being bridged by a bridge line. A switch can selectively switch the radio signals through either the second preamplier or the bridge line, under control of a controller.

10 Claims, 3 Drawing Sheets

(Initial State)

RADIO STATION PREAMPLIFIER CIRCUIT WITH INTERIOR AND EXTERIOR PREAMPLIFIERS

BACKGROUND OF THE INVENTION

The present invention generally relates to radio signal systems. More particularly, the invention relates to an arrangement and a method for preamplifying reception signals for a radio station, particularly for a base station, or respectively, for a radio base station of a mobile radio system, or respectively, of an access network system.

In second generation mobile radio systems, e.g., GSM (Global System for Mobile Communication) see J. Biala, *Mobilfunk and Intelligente Netze*, Viewe Verlag, 1195, particularly pages 57 to 92, as well as presently planned mobile radio systems (UMTS-Universal Mobile Telecommunication System) and in access network systems (see M. Reiss, *Drahtlos zum Freizeichen*, telecom report 18, 1995, pages 34–37), two embodiment types are realized for the design of the reception path for the preamplification of RF reception signals. Thus, in a first embodiment, a preamplifier is integrated into one rack of the base station, usually together with a multicoupling means which distributes the reception signals to a plurality of transceivers. In contrast, in a second embodiment, the preamplifier is positioned as a separate unit in the vicinity of one or more remote antennas and connected via a trunk line to a multicoupling means in the base station.

The first embodiment offers the advantage of a better maintenance opportunity on the basis of the integration in the base station of all the components essential to the processing of the reception signal. The second embodiment has the advantage of guaranteeing a particularly good reception sensitivity of the base station.

In both embodiments, due to the arrangement of the preamplifier upstream of multicoupling means and thus upstream to the transceivers of a base station, a failure of the preamplifier results in a disturbance of the reception at the base station side for the entire radio cell of the base station. Since only a very slight amplification of the reception signals occurs in the multicoupling means, the main burden of the preamplification respectively lies with the preamplifier. This arrangement enables an optimal sensitivity of the reception path, above all given a preamplifier arranged near the antenna, without increasing the demands on the high-level signal behavior of the components connected downstream in the base station. Given a failure of the preamplifier, the sensitivity of the reception path is sharply reduced due to the omission of practically the entire preamplification and to an additional attenuating of the weak reception signals by the trunk line.

Furthermore, failure is particularly critical given a preamplifier positioned near the antenna, since this preamplifier cannot always be reached and accessed easily for maintenance, repair or replacement—as may be the case in winter, given storms, or even at night, for example. Ordinarily the preamplifiers in this embodiment have a means that bridges the amplifier in the event of an error, and thus the reception path is not interrupted. Nevertheless, due to the failing preamplification, the reception path is highly insensitive for the above-mentioned reasons.

The disturbance due to the failure of the preamplifier can be partially compensated for by the use of antenna diversity, since other reception branches of the same or of a neighboring radio cell are seldom jointly affected. However, the service quality of the radio cell is considerably restricted, since qualitative benefits must be foregone due to the antenna diversity.

SUMMARY OF THE INVENTION

It is thus an object of the invention to provide an arrangement and a method which avoid the above-mentioned disadvantages and which secure the preamplification of the reception signals with an optimally low loss of sensitivity of the reception path.

To that end, in an embodiment, the invention provides a circuit for preamplifying signals received by a radio station, comprising:

a) at least one antenna for receiving radio signals;

b) a first preamplifier coupled between the antenna circuit and the radio station, the first preamplifier coupled to the antenna via an antenna feed line, the first preamplifier line coupled to the radio station via a trunk line;

c) a switch coupled to the trunk line, the switch having a control signal input;

d) a second preamplifier coupled to the switch;

e) a bridge line coupled to the switch and across the second preamplifier to effect a bypass of the second preamplifier; and f) a control signal generator coupled to the switch;

wherein, the control signal generator is effective to generate a control signal to cause the switch to switch radio signals through the bridge line or the second preamplifier.

In an embodiment, the invention provides a method for preamplification of radio signals received by a radio station, comprising the steps of receiving radio signals via at least one antenna unit, preamplifying the radio signals in a first preamplifier which is provided outside of the radio station and is connected to the radio station via a trunk line and to the antenna unit via an antenna feed, usually bypassing a second preamplifier which is provided within the radio station with a bridge line connected in parallel to the second preamplifier, and switching the radio reception signals from the bridge line to the second preamplifier under the control of a controller, given an outage of the first preamplifier.

Thus, in accordance with the invention, a radio station is connected to at least one antenna unit for receiving radio signals. A first preamplifier or preamplifying means is realized outside the radio station and thereto via a trunk line. The first preamplifying means is connected to the antenna unit via an antenna feed and serves for the preamplification of reception signals. A second preamplifier or preamplifying means is provided in the radio station, this second preamplifying means likewise serving for the amplification of the reception signals.

Connected in parallel to the second preamplifying means is a bridge line with which the second preamplifying means is bridged. A changeover means or switch is connected upstream of the bridge line and that second preamplifying means. The changeover means or switch is actuated by a control signal of a control means and switches the reception signals from the bridge line to the second preamplifying means.

By means of the changeover means or switch and the second preamplifying means, the inventive arrangement assures the preamplification of signals in the reception path even given a failure, potential failure or other outage of the first preamplifying means, so that maintenance, repair or replacement can occur at a favorable time for the operator. The sensitivity of the reception path is reduced only by the attenuation of the cable in the trunk line between the first preamplifying means and the radio station.

According to one embodiment of the invention, a bridging switch is provided in the first preamplifying means, this switch bridging the first preamplifying means given an insufficient functioning or failure thereof. It is advantageously assured by this bridging switch that the reception path is not interrupted given a failure of the first preamplifying means.

In order to indicate occurrence of the bridging of the first preamplifying means to the control means in the radio station in this embodiment of the invention, alarm signals can be transmitted to the control means. To that end, in another embodiment of the invention, these alarm signals are transmitted via an alarm message line that leads from the first preamplifying means to the control means. In another embodiment of the invention, the alarm signals are modulated or multiplexed onto the trunk line by a modulator or multiplexor means, then received in a demodulator, or respectively, demultiplexor means in the radio station and transmitted to the control means via a measuring line. In either embodiment, the control means derives the control signal from the alarm signals, this control signal actuating the changeover means for switching the reception signals to the second preamplifying means.

The first described embodiment of the invention for the transmission of the alarm signals has the advantage of a very simple technical realization without modulating or multiplexing the alarm signals onto the trunk line and without additional means for receiving the alarm signals. On the other hand, the second embodiment has the advantage that the existing trunk line is used for the transmission of the alarm signals, and thus no additional alarm message line needs to lead from the first preamplifying means to the control means.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

Figure 1:
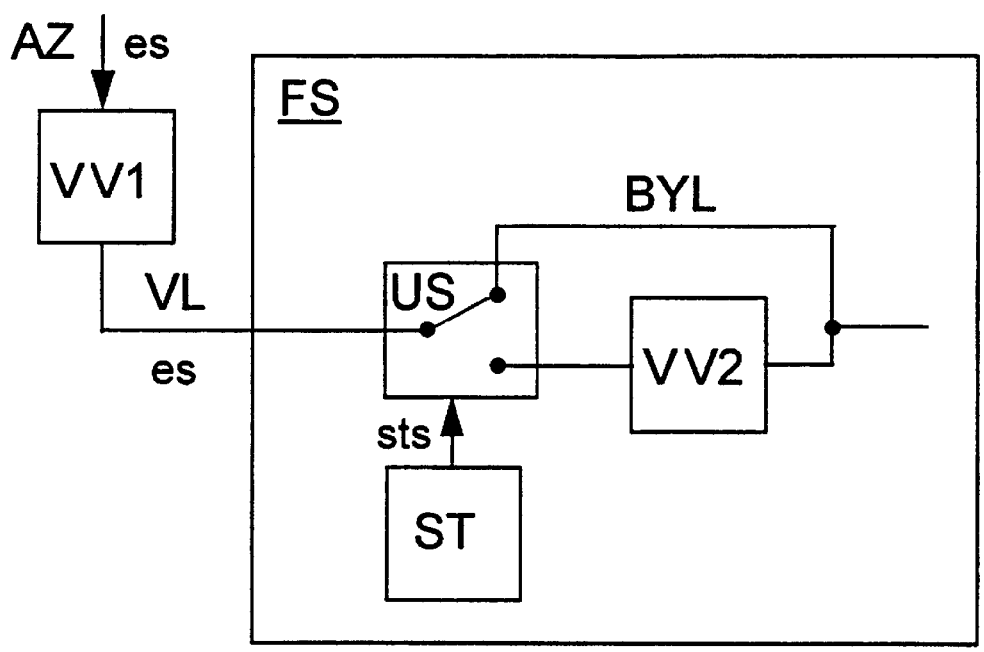
FIG. 1 illustrates a block wiring diagram of an embodiment of the invention with a radio station, a first preamplifying means realized outside the radio station, and a second preamplifying means realized inside the radio station.

The embodiment of the invention illustrated in FIG. 1 shows a radio station FS with an externally arranged first preamplifying means VV1 that is connected via an antenna feed AZ to one or more antenna units for the reception of radio signals. The first preamplifying means VV1 is connected to the radio station FS via a trunk line VL. A second preamplifying means VV2 is provided in the radio station FS, this means VV2 being bridged by a bridge line BYL connected in parallel fashion. A changeover means (switch) US connected upstream of and to both the second preamplifying means VV2 and the bridge line BYL can switch the reception signals es from the bridge line BYL to the second preamplifying means VV2. The changeover means US is actuated by a control signal sts generated by a control means ST. The preamplified reception signals es can be further processed in components of the radio station downstream of the second preamplifying means VV2 such as means for signal processing, for example.

In normal operation, the reception signals are preamplified in the first preamplifying means VV1 and switched in the radio station FS to the bridge line BYL by the changeover means US. The second preamplifying means VV2 is thereby bypassed. However, the functioning of the first preamplifying means VV1 can be checked continuously or periodically. For example, the control means ST can be formed as a logic element or microprocessor element with software-controlled functionality.

Given an insufficient functioning, e.g., an outage for maintenance, or a failure of the first preamplifying means VV1, for example, or some other outage a control signal sts is generated in the control means ST, the changeover means US for switching the reception signal es to the second preamplifying means VV2 can be actuated with this signal. When the switch US is activated, the second preamplifying means VV2 subsequently takes over the preamplification of the reception signal es, while the first preamplifying means VV1 can be maintained, repaired or replaced. Because of this arrangement, there is only a temporary disturbance of the reception, or, respectively, a lower sensitivity of the reception path at the radio station side, since a preamplification of the reception path at the radio station side, since a preamplification of the reception signals es is assured. Following the repair or replacement of the first preamplifying means VV1, the means VV1 can in turn again take over the preamplification of the reception signals es, whereby the second preamplifying means VV2 is again bridged or bypassed by the bridge line BYL.

Figure 2:
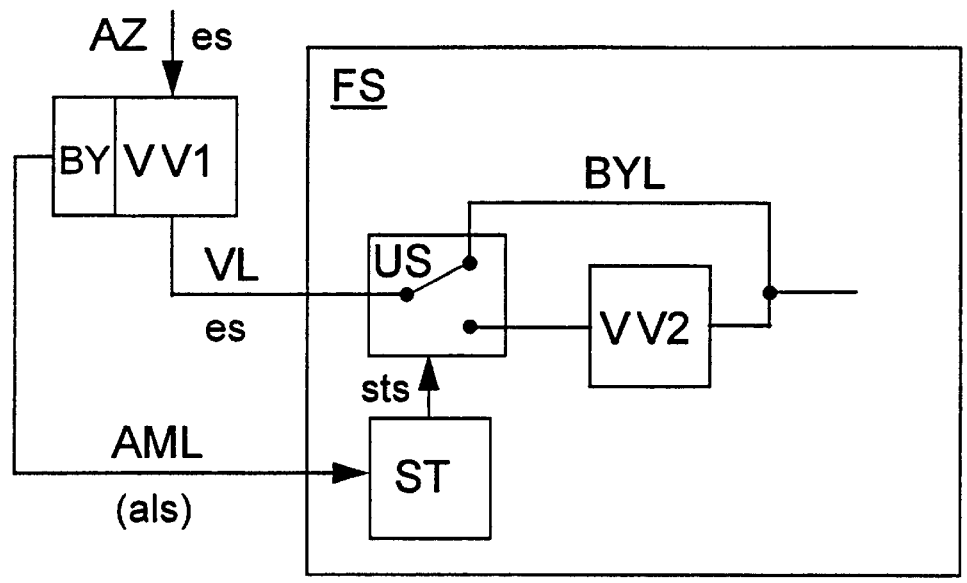
FIG. 2 illustrates a block wiring diagram of the arrangement as in FIG. 1, width an added bridging means provided in the first preamplifying means.

The radio station FS depicted in FIG. 2 is likewise based on the radio station FS according to FIG. 1. In the first preamplifying means VV1 arranged outside the radio station FS, a bridging switch BY is provided, which, given an insufficient functioning, or, respectively, a failure of this first preamplifying means VV1, effect a bypass of the means VV1, this in order not to interrupt the reception path. However, given a successful bypass, the bridging switch BY transmits alarm signals als via an alarm message line AML that separately leads from the first preamplifying means VV1 to the control means ST. The alarm signals als are depicted in brackets, since they are transmitted only given a successful bridging of the first preamplifying means VV1, as previously described.

In this embodiment, the control means ST is not responsible for comparing a measuring signal to a threshold value, but rather for deriving the control signal sts for actuating the changeover means US from the alarm signals als. In the normal state, the second preamplifying means VV2 is bridged by the bridge line BYL. Given the bridging of the first preamplifying means VV1, the changeover means US—actuated by the control signal sts—switches the reception signals es to the second preamplifying means VV2, which subsequently takes over the amplification of the reception signals es.

Figure 3:
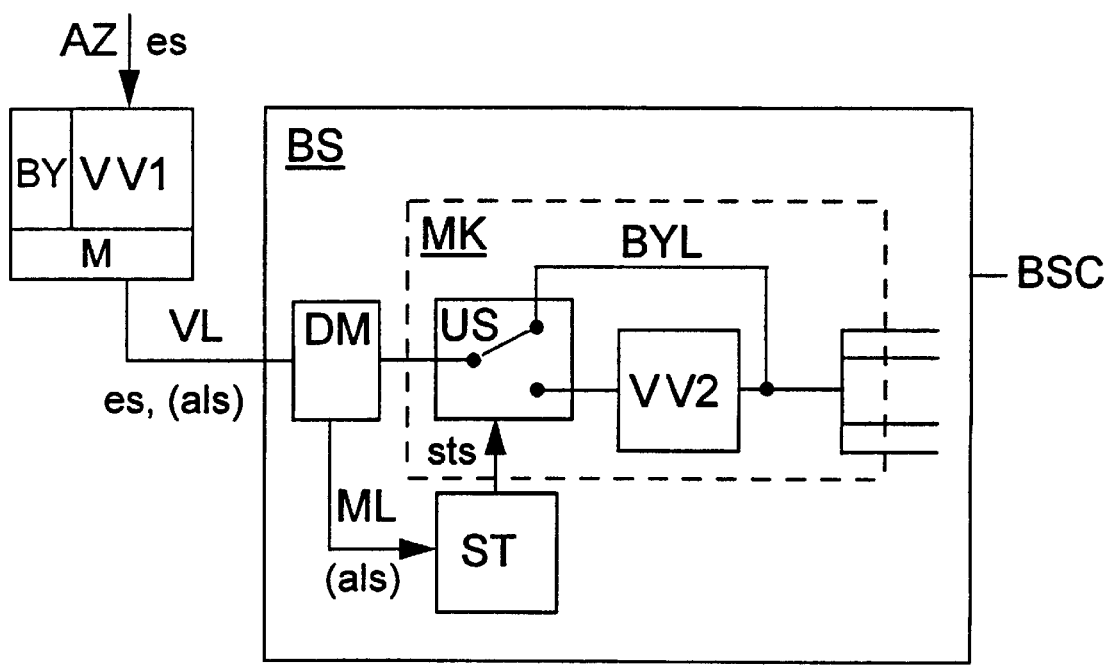
FIG. 3 illustrates a block wiring diagram of an arrangement with a base station of a mobile radio system corresponding to the radio station in FIG. 2 with a modulator or multiplexor means provided in the first preamplifying means, and with a corresponding demodulator, or respectively, demultiplexor means provided in the base station.

In FIG. 3 there is illustrated a base station configuration. The base station BS of a mobile radio system is based on the radio station FS according to FIG. 2. The base station BS is connected to the first preamplifying means VV1 via a trunk line VL, and from there via an antenna feed AZ to a remote antenna unit (not shown) for receiving radio signals of mobile stations located inside one or more radio cells supplied with technical resources by the antenna unit, and also to a base station control unit BSC.

In this embodiment, the second preamplifying means VV2, the bridge line BYL and the changeover means US are integrated in a multicoupling means MK of the base station BS which further conducts the preamplified reception signals es to transceiver-receivers. These three components can also be provided separately from the multicoupling means MK and connected thereto at the output side, however.

Given a bridging of the first preamplifying means VV1 on the basis of an insufficient functioning, or, respectively, a failure, alarm signals als are modulated or multiplexed onto the trunk line VL by means of a modulator or multiplexor means M provided in the first preamplifying means VV1, and these signals are transmitted to the base station BS together with the reception signals es. The alarm signals als are received and filtered out of the reception signals es by a demodulator, or, respectively, demultiplexor means DM which is provided in the base station BS and connected to and upstream of the changeover means US, so that only the reception signals es are supplied to the changeover means US. The received alarm signals als are transmitted to the control means ST via measuring line ML and are evaluated there. Based on the alarm signals es the control means ST conducts the control signal sts for switching the reception signals es to the second preamplifying means VV2.

A signal modulator and a signal multiplexor can be referred to generically, and are so referred to herein, as a signal communicator. Similarly, a signal demodulator and a signal demultiplexor can be referred to generically, and are so referred to herein, as a signal extractor.

The depicted base station BS can also be realized as radio base station RBS of an access network system in which communications terminals in buildings communicate with the radio base station RBS via wireless network terminal units. In this case, the radio base station RBS is connected to a radio base station control unit RBC of the access network system.

Figure 4:
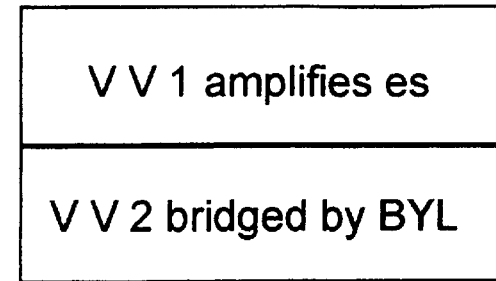
FIG. 4 illustrates a flow chart of the inventive method for the arrangement in FIG. 2, or respectively, FIG. 3.
Figure 4:
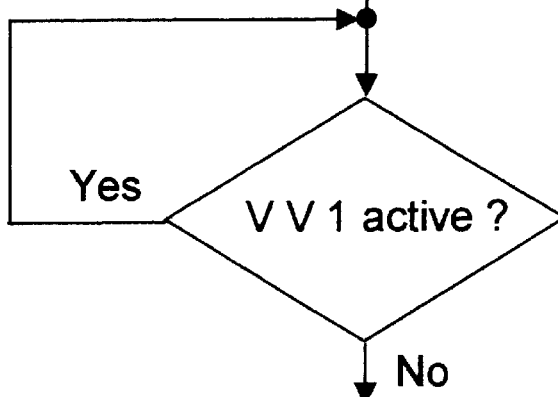
Figure 4:
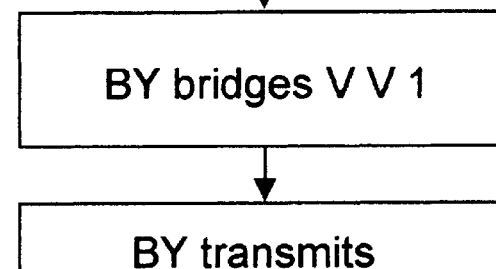
Figure 4:
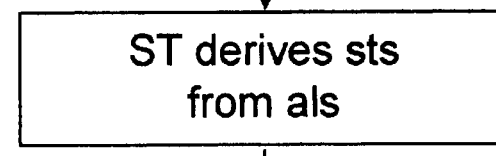
Figure 4:
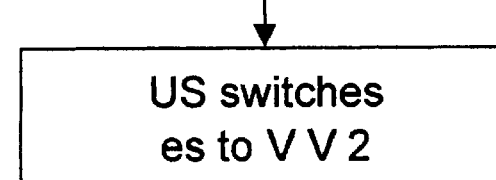
Figure 4:
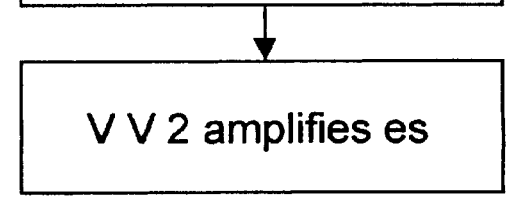

FIG. 4 illustrates a flow chart of the inventive method for the arrangements of FIG. 2 and FIG. 3. The initial state of the method is the normal functioning of the first preamplifying means VV1, which preamplifies the radio signals es received via the antenna unit and makes these available to the radio station for further processing. The second preamplifying means VV2 in the radio station FS is bridged, i.e., bypassed, by the bridge line BYL which is connected thereacross in parallel fashion.

The functioning of the first preamplifying means VV1 is monitored continuously or periodically by the control means ST in the radio station FS. If there is an erroneous functioning or a failure of the first preamplifying means VV1, this is bridged (bypassed) by the bridging switch BY in the first preamplifying means VV1, so that the reception path is not interrupted. The bridging switch BY consequently transmits alarm signals als to the control means ST, either via a separate alarm message line AML or by a suitable modulation or multiplexing via the trunk line VL. From these alarm signals als, the control means ST operates the control signal sts for actuating the changeover means (switch) US, whereby the reception signals es are switched in the changeover means US to the second preamplifying means VV2, which consequently amplifies the reception signals.

Although modifications and changes may be suggested by those skilled in the art, it is the intention of the inventors to embody within the patent warranted hereon all changes and modifications as reasonably and properly come within the scope of their contribution to the art.

What is claimed is:

1. A circuit for preamplifying signals received by a radio station, comprising:
   a) at least one antenna for receiving radio signals;
   b) a first preamplifier coupled between the antenna circuit and the radio station and positioned outside of the radio station, the first preamplifier coupled to the antenna via an antenna feed line, the first preamplifier coupled to the radio station via a trunk line;
   c) a switch coupled to the trunk line, the switch having a control signal input;
   d) a second preamplifier positioned within the radio station and coupled to the switch;
   e) a bridge line coupled to the switch and across the second preamplifier to effect a bypass of the second preamplifier;
   f) a control signal generator coupled to the switch the control signal generator being effective to generate a control signal to cause the switch to switch radio signals through the bridge line or the second preamplifier; and
   g) a bridging switch operatively configured and coupled to effect a selective bypass of the first preamplifier.

2. A circuit for preamplifying signals received by a radio station, comprising:
   a) at least one antenna for receiving radio signals;
   b) first preamplifier coupled between the antenna circuit and the radio station, the first preamplifier coupled to the antenna via an antenna feed line, the first preamplifier coupled to the radio station via a trunk line;
   c) a switch coupled to the trunk line, the switch having a control signal input;
   d) a second preamplifier coupled to the switch;
   e) a bridge line coupled to the switch and across the second preamplifier to effect a bypass of the second preamplifier;
   f) a control signal generator coupled to the switch; and
   g) a bridging switch operatively configured and coupled to effect a selective bypass of the first preamplifier,
   wherein,
      the control signal generator is effective to generate a control signal to cause the switch to switch radio signals through the bridge line or the second preamplifier, and
      the bridging switch is configured to transmit an alarm signal via an alarm message line leading from the bridging switch to the control signal generator upon bypass of the first preamplifier, and from the alarm signal, the control signal generator derives the control signal for actuating the switch for switching the radio signals through the second preamplifying means instead of the bridge line.

3. A circuit for preamplifying signals received by a radio station, comprising:
   a) at least one antenna for receiving radio signals;
   b) a first preamplifier coupled between the antenna circuit and the radio station, the first preamplifier coupled to the antenna via an antenna feed line, the first preamplifier line coupled to the radio station via a trunk line;
   c) a switch coupled to the trunk line, the switch having a control signal input;

d) a second preamplifier coupled to the switch;

e) a bridge line coupled to the switch and across the second preamplifier to effect a bypass of the second preamplifier;

f) a control signal generator coupled to the switch; and g) a bridging switch operatively configured and coupled to effect a selective bypass of the first preamplifier, the bridging switch comprising a signal communicator, the bridging switch configured to transmit an alarm signal to the control signal generator via the trunk line, and signal extractor in the radio station and having an output coupled to the control signal generator, wherein, the control signal generator is effective to generate a control signal to cause the switch to switch radio signals through the bridge line or the second preamplifier, and the control signal generator derives from the alarm signal the control signal for actuating the switch for switching the input signals to the second preamplifying means.

4. A method for preamplification of radio signals received by a radio station, comprising the steps of:

receiving radio signals via at least one antenna unit;

preamplifying the radio signals in a first preamplifier, which first preamplifier is provided outside of the radio station and is connected to the radio station via a trunk line and to the antenna unit via an antenna feed;

normally bypassing a second preamplifier, which is provided within the radio station, with a bridge line connected in parallel to the second preamplifier;

generating a control signal with a controller;

switching the radio reception signals from the bridge line to the second preamplifier under the control of a controller, given an outage of the first preamplifier;

bridging the first preamplifier given outage of the first preamplifier; and given bridging of the first preamplifier, transmitting an alarm signal to the controller, and deriving the control signal from the alarm signal in the controller.

5. A method for preamplification of radio signals received by a radio station, comprising the steps of:

receiving radio signals via at least one antenna unit, preamplifying the radio signals in a first preamplifier, which is provided outside of the radio station and is connected to the radio station via a trunk line and to the antenna unit via an antenna feed, normally bypassing a second preamplifier which is provided within the radio station with a bridge line connected in parallel to the second preamplifier;

generating a control signal with a controller;

switching the radio reception signals from the bridge line to the second preamplifier under the control of a controller, given an outage of the first preamplifier modulating the alarm signal to generate a modulated signal and then transmitting the modulated signal via the trunk line; and demodulating the modulating signal in the controller to extract the alarm signal, wherein, the first preamplifier is bridged given outage of the first preamplifier, and given bridging of the first preamplifier transmitting an alarm signal to the controller and deriving the control signal from the alarm signal in the controller.

6. A method for preamplification of radio signals received by a radio station, comprising the steps of:

receiving radio signals via at least one antenna unit, preamplifying the radio signals in a first preamplifier, which is provided outside of the radio station and is connected to the radio station via a trunk line and to the antenna unit via an antenna feed, normally bypassing a second preamplifier which is provided within the radio station with a bridge line connected in parallel to the second preamplifier;

generating a control signal with a controller;

switching the radio reception signals from the bridge line to the second preamplifier under the control of a controller, given an outage of the first preamplifier;

multiplexing the alarm signal with the multiplexed signal and then transmitting the multiplexed signal to the controller; and demultiplexing the multiplexed signal in the controller to extract the alarm signal, wherein, the first preamplifier is bridged given outage of the first preamplifier.

7. The circuit of claim 3, wherein the signal communicator is a signal modulating unit and the signal extractor is a signal demodulating unit.

8. The circuit of claim 3, wherein the signal extractor is a signal multiplexing unit and the signal extractor is a signal demultiplexing unit.

9. The circuit of claim 1, wherein the radio station comprises a base station of a mobile radio system which receives radio signals of mobile stations located in the coverage area of the base station.

10. The circuit according to claim 1, whereon the radio station comprises a radio base station of an access network system which receives radio signals from wireless network terminal units located in the coverage area of the radio base station.

* * * * *